United States Patent

Owa

[19]

[11] Patent Number: 5,819,012
[45] Date of Patent: Oct. 6, 1998

[54] METHOD FOR COMPRESSING AND RESTORING DATA USING DIFFERENCES BETWEEN CORRESPONDING LINE DATA OF ADJACENT BANDS AND APPARATUS USING THE SAME

[75] Inventor: Kenichi Owa, Kanagawa, Japan

[73] Assignee: Fuji Xerox Co., Ltd., Tokyo, Japan

[21] Appl. No.: 496,175

[22] Filed: Jun. 28, 1995

[30] Foreign Application Priority Data

Jun. 29, 1994 [JP] Japan ..................................... 6-147942

[51] Int. Cl.$^6$ ........................................................ G06F 15/00
[52] U.S. Cl. ............................................ 395/114; 382/232
[58] Field of Search ........................................ 395/101, 109, 395/112, 114, 118; 358/426, 261.1, 261.2, 261.3, 427, 430, 443, 467; 382/232, 234, 236, 245, 246, 238, 239, 244, 248; 364/715.02

[56] References Cited

U.S. PATENT DOCUMENTS

| | | | |
|---|---|---|---|
| 4,751,742 | 6/1988 | Meeuer | 382/240 |
| 5,068,725 | 11/1991 | Ogawa et al. | 348/437 |
| 5,317,413 | 5/1994 | Yanagihara | 386/131 |
| 5,513,128 | 4/1996 | Rao | 364/514 R |

FOREIGN PATENT DOCUMENTS 62-171383   7/1987   Japan ............................ H04N 1/417

*Primary Examiner*—David K. Moore
*Assistant Examiner*—Gabrial Garcia
*Attorney, Agent, or Firm*—Finnegan, Henderson, Farabow, Garrett & Dunner, L.L.P.

[57] ABSTRACT

Printing is effected in units of data of a band that includes a plurality of line data while a recording head is moved perpendicularly to the movement direction of a recording medium. An output interface receives compressed data from an external apparatus. An output buffer retains data of the nth band even after printing of those data. An output processing section judges whether each line data of the (n+1)th band is compressed data, empty data, or non-compressed data. For the compressed data, the output processing section restores the line data of the (n+1)th band using differences from corresponding line data of the nth band, and updates the corresponding line data of the output buffer. For the empty data, the output processing section erases the corresponding line data of the output buffer. For the non-compressed data, the output processing section overwrites the line data of the (n+1)th band on the corresponding line data of the output buffer.

4 Claims, 3 Drawing Sheets

FIG. 4(A) [1] [DIFFERENCE LINE DATA]

FIG. 4(B) [2]

FIG. 4(C) [0] [LINE DATA]

METHOD FOR COMPRESSING AND RESTORING DATA USING DIFFERENCES BETWEEN CORRESPONDING LINE DATA OF ADJACENT BANDS AND APPARATUS USING THE SAME

BACKGROUND OF THE INVENTION

The present invention relates to a recording apparatus which records a dot-matrix image through scanning with a recording head, for instance, a multi-nozzle scanning head.

In conventional image recording apparatuses, for instance, a color ink jet recording apparatus, printing is performed based on color data that are separated for primary colors (black, cyan, magenta and yellow). The color data are stored in a storage device of a certain capacity in the form of "0"/"1" information that indicates absence or presence of a dot of each primary color. In general, in a serial printer, which is less expensive than a page printer, a recording sheet is scanned by a printing head while being fed in accordance with the scanning with the printing head. Printing onto the recording sheet is completed by repeating the above operation. Therefore, in the serial printer, the storage device usually stores data of a printing area corresponding to one scanning of the printing head. In general, a control section of such a printer processes, as line data, printing data that are sent from an external peripheral apparatus such as a host computer. Line data are developed in a memory over a printing head width (one band) in the direction perpendicular to the printing head movement direction. However, in this printing method, data processing should be performed for the respective lines corresponding to a plurality of nozzles of the head that constitute one band. Therefore, a large number of data processing steps, bit operations, and other operations sometimes make the memory development time unduly long.

On the other hand, with reductions in prices and improvements in functions of workstations and personal computers, a scheme is now widely employed in which printing data are processed in a host computer. Further, with reductions in prices and increased degrees of integration of semiconductor-related products, the separation of multi-value data into primary color data and the binarizing processing are now performed in many cases on the side of an external peripheral apparatus.

However, where the image processing is performed in a host computer and the printing is performed in a recording apparatus, the transfer speed determines the entire processing speed to whatever extent the ability of the host computer is improved. Therefore, if printing data are transmitted from the host computer in an usual manner, there is a possibility that the printing execution time becomes unrealistically long. In view of this problem, various data compression transfer methods have been proposed for the printing data transfer from a host computer to a recording apparatus. For example, Japanese Unexamined Patent Publication No. Sho. 62-171383 discloses a data compression method in which only difference data of each 2-line dot data is transferred. In data compression transfer methods, a recording apparatus receives compressed printing data, restores original printing data, and develops those data in a memory.

However, in the conventional data compression and development methods, since the same memory is used for each band, the memory needs to be subjected to overwriting or erasure for the entire band. Further, in restoring original printing data from compressed data, the following operations are needed: storing the preceding line data by use of a data restoration program, performs logical operations such as AND and exclusive OR between the current line data and the preceding line data, and writing the line data to the memory. This is a factor of increasing the load of the recording apparatus side and delaying the printing execution.

SUMMARY OF THE INVENTION

An object of the present invention is to provide a data compression and restoration method that can perform printing at high speed without a delay of printing execution, which would occur in the conventional method of receiving compressed printing data and writing results of operations with the preceding data to a memory on a band-by-band basis, as in the data compression method in which printing data corresponding to the printing width of a recording head is compressed and sent to a recording apparatus. Another object of the invention is to provide a recording apparatus using such a data compression and restoration method.

According to the invention, a method for compressing and restoring data in units of a band that includes a plurality of lines, comprises the steps of:

compressing data of an (n+1)th band based on differences of each line data of the (n+1)th band from corresponding line data of an nth band; and in a receiving side, storing the data of the nth band; and restoring the data of the (n+1)th band from the stored data of the nth band using the differences from the data of the nth band.

The above method may comprise the steps of:

in the compressing step, judging whether each line data of the (n+1)th band is empty data, and whether when compressed, each line data of the (n+1)th band will have a data amount that is larger than that of a corresponding line data of the nth band;

compressing part of the line data of the (n+1)th band for which part a judgment was made that the data amount would be increased;

attaching, at a head of each line data of the (n+1)th band, a discrimination code indicating whether the associated line data is compressed data, empty data, or non-compressed data;

transferring the compressed data of the (n+1)th band;

in the receiving side, analyzing the compressed data of the (n+1)th band to check for a compression type;

for the compressed data, restoring the line data of the (n+1)th band using the differences from the corresponding line data of the nth band, and updating the corresponding stored line data;

for the empty data, erasing the corresponding stored line data; and for the non-compressed data, updating the corresponding stored line data directly based on the line data of the (n+1)th band.

Further, according to the invention, a recording apparatus which performs a printing operation in units of data of a band that includes a plurality of line data while moving a recording head perpendicularly to a movement direction of a recording medium, comprises:

means for receiving compressed data from an external apparatus;

storage means capable of storing data of at least one band, for retaining data of an nth band even after printing of those data; and an output processing section for restoring data of an (n+1)th band from the stored data of the nth band.

In the above recording apparatus, the output processing section may operate as follows. That is, it judges whether each line data of the (n+1)th band is compressed data, empty data, or non-compressed data. For the compressed data, it restores the line data of the (n+1)th band using differences from corresponding line data of the nth band and updates the corresponding line data of the storage means. For the empty data, it erases the corresponding line data of the storage means. For the non-compressed data, it updates the corresponding line data of the storage means directly based on the line data of the (n+1)th band.

BRIEF DESCRIPTION OF THE DRAWINGS

FIG. 4(a), 4(b), and 4(c) illustrate examples of line data.

DESCRIPTION OF THE PREFERRED EMBODIMENTS

An embodiment of the present invention will be hereinafter described in detail with reference to the accompanying drawings.

Figure 1:
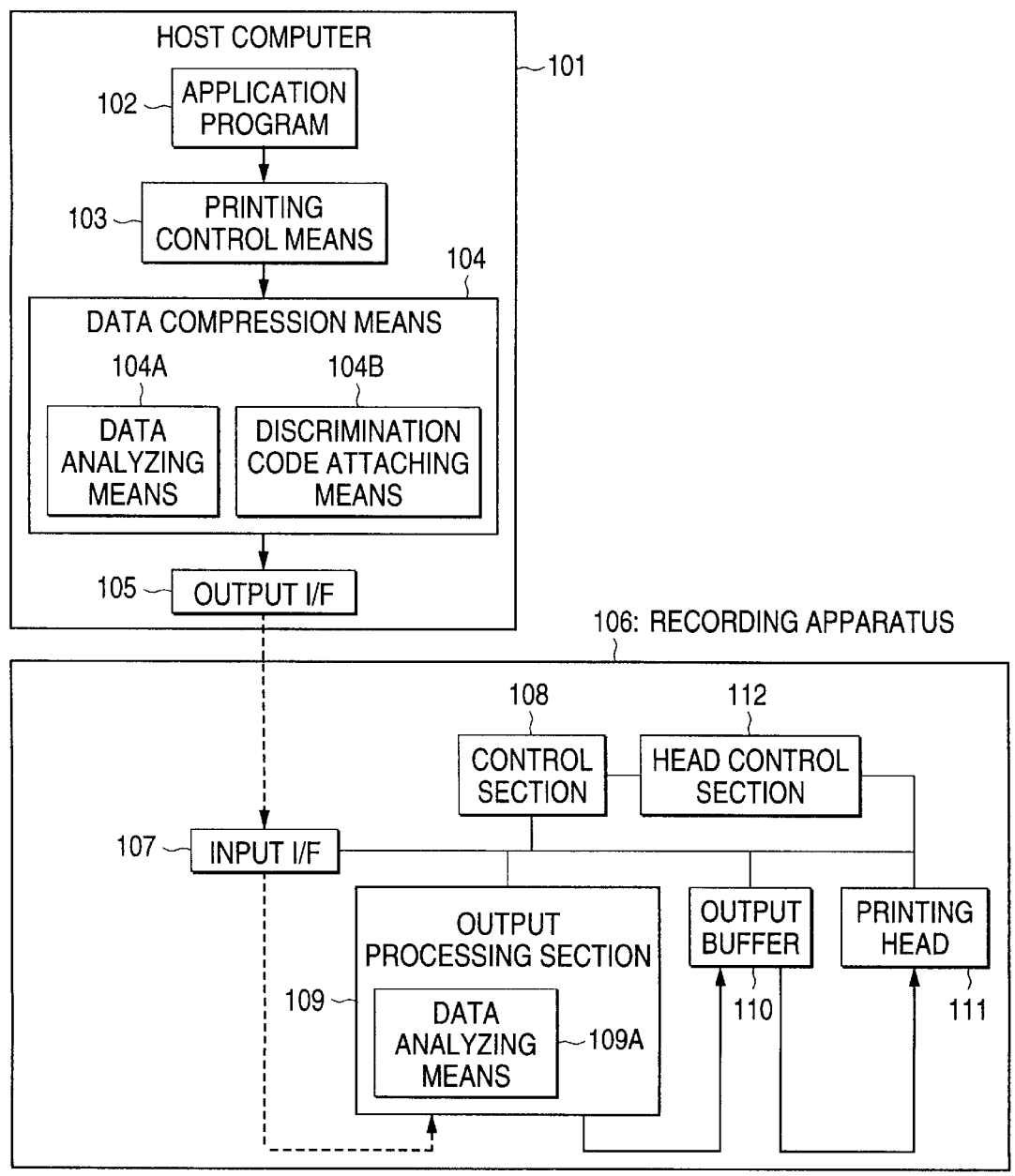
FIG. 1 shows a configuration of a first embodiment of the present invention.

FIG. 1 shows a configuration of a first embodiment of the invention, which is directed to a case where a recording apparatus records printing data that are sent from a host computer.

In a host computer 101, programs etc. for realizing various tasks are executed. A text, figure, image, etc. are generated by means of an application program 102. A printing control means 103 performs format conversion and other operations on data to be transferred to a recording apparatus 106. Upon execution of an output command, the printing control means 103 generates data suitable for processing in the recording apparatus 106. To reduce the amount of data sent to the recording apparatus 106 to thereby shorten the time required for the data transfer, a data compression means 104 compresses data, and the compressed data are transferred from an output interface 105 to the recording apparatus 106.

In the recording apparatus 106, an control section 108 forwards data that have been received by an input interface 107 to an output processing section 109, which generates printing data in an output format. The printing data are sent from an output buffer 110 to a printing head 111, which performs printing. Based on results of analysis of the compressed data performed by the output processing section 109, a printing head control section 112 performs printing of the nth band while reading out contents of the output buffer 110, and causes the output buffer 110 to retain the printing data that have been subjected to printing. Then, the output processing section 109 analyzes transferred compressed data of the (n+1)th band, subjects those data to exclusive OR with the nth-band data retained by the output buffer 110, and generates printing data of the (n+1)th band based on the nth-band data. Thus, printing of the (n+1)th band is effected.

Figure 2:
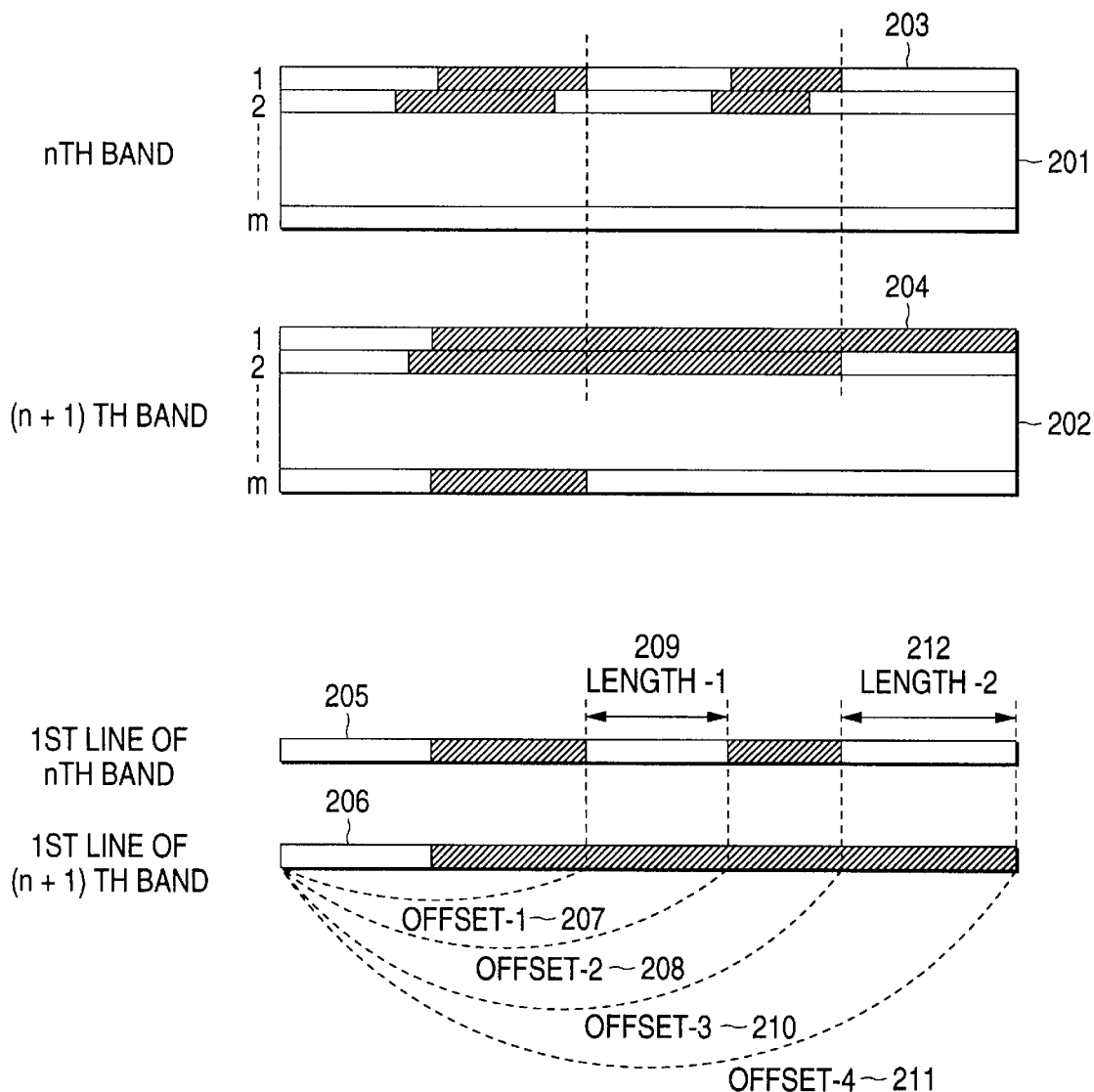
FIG. 2 illustrates a data compression method according to the invention.

A description will be made of the data compression. As for a compression algorithm, the run-length compression and offset setting to compression data, which are now widely employed, and other techniques may be used. FIG. 2 illustrates a data compression method according to the invention. Each of the nth band and the (n+1)th band consists of the first to mth line data, where m is equal to the number of dots of the printing head. Compression is performed on a line data basis. In the following, a description will be made with attention paid to the first line data 203 of the nth band 201 and the first line data 204 of the (n+1)th band 202. Each of the first line data 203 and 204 consists of black portions having printing dots and white portions not having printing dots. Exclusive OR is taken between the first line data 203 of the nth band 201 and the first line data 204 of the (n+1)th band 202 starting from head data 205 and 206. Offset-1 207 at which the exclusive OR operations first produce a result "true" is stored. Then, offset-2 208 at which the exclusive OR operations first produce a result "false" after offset-1 207 is stored. Length-1 209 where the nth-band data and the (n+1)th-band data are different from each other is determined from offset-1 207 and offset-2 208. The logical operations are continued in the similar manner, as a result of which the next variation points, i.e., offset-3 210 and offset-4 211 are detected and length-2 212 is detected where the nth-band data and the (n+1)th-band data are different from each other. Thus, the 1-line processing is completed. The compression data consists of offset-1, length-1, offset-3 and length-2.

Figure 3:
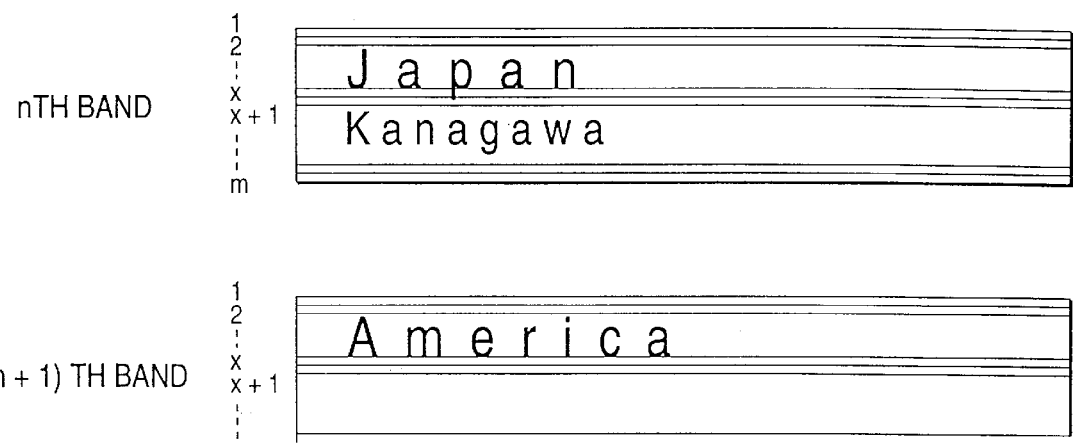
FIG. 3 shows a printing example of a business document.

In line data of a business document, as shown in FIG. 3, characters of a certain size are arranged at fixed intervals with reference to the base line. In this example, in the (n+1)th band, while a large number of compressed data occur between the first to xth lines, the (x+1)th to mth lines have empty data. In the case of empty data, the data transfer and processing time can be reduced by simply indicating that the data are empty data compared to the case of generating compressed data by taking operations with the preceding line data and then restoring the original data from the compressed data.

FIG. 4(a), 4(b), and 4(c) show examples of one line data. As shown in FIG. 4(a), 4(b), and 4(c) considering the above fact, a compression data discrimination code box 401 is provided at the head of each line data. In the case of compressed data produced by taking operations between corresponding line data of the adjacent bands (compression method-1), a discrimination code "1" is given to the box 401 as shown in part (A) of FIG. 4(a) In the case of empty line data, no compression is performed and a discrimination code "2" is given to the box 401 as shown in FIG.4(B). Where the compression increases the data amount as in the case of line data next to empty line data or very simple line data, no compression is performed and a discrimination code "0" is given to the box 401 as shown in FIG.4(c). In this case, line data are transferred.

A description will be made of data restoration processing on the recording apparatus side. After the nth-band data are developed in the output buffer 110 and a printing operation therefor is performed, those data are retained by the output buffer 110, i.e., are not erased. Upon reception, the compressed (n+1)th-band data are analyzed by the output processing section 109. That is, it is judged based on the discrimination code at the head of each line data whether the data has been subjected to compression method-1, or is empty data or non-compressed data. Where the line data has been subjected to compression method-1, as for, for instance, the first line data 204 of the (n+1)th band shown in FIG. 2, the output processing section 109 writes exclusive-ORed data to the output buffer 110 over length-1 from offset-1, and then over length-2 from offset-3. Thus, output of the first line data 204 is completed. In the case of empty data, all the mth line data of the (n+1)th band is erased. In the case of non-compressed data, the printing data is overwritten on the mth line data.

As described above, according to the invention, in the serial printer which performs printing of one page on a band-by-band basis, the printing execution time can be shortened by reducing printing data that are transmitted from a host computer and the necessary size of a memory can be reduced by causing the memory to retain data of one band and utilizing those data to form data of the next band. Therefore, high-speed printing can be performed with a memory of a smaller size.

What is claimed is:

1. A method for compressing and restoring bands of data having band widths corresponding to the width of a printing head of a serial printer and including plurality of lines, comprising the steps of:

detecting differences between the data of a line in an (n+1)th band and the data of a corresponding line in an nth band;

compressing the data of the (n+1)th band based on the detected differences, the compressing step further including the following substeps:

judging whether each line data of the (n+1)th band is empty data, and whether when compressed, each line data of the (n+1)th band will have a data amount that is larger than that of a corresponding line data of the nth band;

compressing part of the line data of the (n+1)th band for which part a judgment was made that the data amount would be increased;

attaching, at a head portion of each line data of the (n+1)th band, a discrimination code indicating whether the associated line data is compressed data, empty data, or non-compressed data;

transferring the compressed data of the (n+1)th band;

analyzing the compressed data of the (n+1)th band to check for a compression type;

for the compressed data, restoring the line data of the (n+1)th band using the detected differences, and updating the corresponding stored line data;

for the empty data, erasing the corresponding stored line data; and for the non-compressed data, updating the corresponding stored line data directly based on the line data of the (n+1)th band;

storing the data of the nth band in a memory; and restoring the data of the (n+1)th band based upon the stored data of the nth band and the detected differences between the data of a line in the (n+1)th band and the data of a corresponding line in the nth band.

2. An apparatus for restoring compressed bands of data having band widths corresponding to the width of a printing head of a serial printer and including a plurality of lines, comprising:

means for receiving compressed data from an external apparatus;

storage means for storing data of an nth band; and an output processing section for restoring data of an (n+1)th band from the stored data of the nth band, the output processing section further including:

means for judging whether each line data of the (n+1)th band is compressed data, empty data, or non-compressed data;

for the compressed data, means for restoring the line data of the (n+1)th band using differences from corresponding line data of the nth band and updating the corresponding line data of the storage means;

for the empty data, means for erasing the corresponding line data of the storage means; and for the non-compressed data, means for updating the corresponding line data of the storage means directly based on the line data of the (n+1)th band.

3. The apparatus of claim 2, wherein the means for receiving further includes means for receiving difference data corresponding to the differences between the data of a line in the (n+1)th band and the data of a corresponding line in the nth band.

4. The apparatus of claim 3, wherein the output processing section restores the data of the (n+1)th band based upon the stored data of the nth band and the differences between the data of a line in the (n+1)th band and the data of a corresponding line in the nth band.

\* \* \* \* \*

UNITED STATES PATENT AND TRADEMARK OFFICE
CERTIFICATE OF CORRECTION

PATENT NO. : 5,819,012
DATED : October 06, 1998
INVENTOR(S) : Kenichi OWA

It is certified that error appears in the above-identified patent and that said Letters Patent is hereby corrected as shown below:

Claim 1, Column 5, line 16, before "plurality", insert --a--.

Signed and Sealed this

Twenty-seventh Day of July, 1999

Attest:

Q. TODD DICKINSON

*Attesting Officer*   *Acting Commissioner of Patents and Trademarks*